(12) United States Patent
Deng et al.

(10) Patent No.: US 6,583,996 B2
(45) Date of Patent: Jun. 24, 2003

(54) METHOD AND SYSTEM FOR DETECTING A NEGATIVE SEQUENCE FOR THREE PHASE GRID-CONNECTED INVERTER SYSTEMS

(75) Inventors: Doug Deng, Canton, MI (US); Kon-King Mike Wang, Canton, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 09/683,060

(22) Filed: Nov. 14, 2001

(65) Prior Publication Data

US 2002/0044464 A1 Apr. 18, 2002

(51) Int. Cl.⁷ .............................. H02M 1/12; H02M 1/14
(52) U.S. Cl. .......................... 363/40; 363/56.02; 363/98
(58) Field of Search ......................... 363/40, 41, 56.02, 363/97, 98, 132, 136

(56) References Cited

U.S. PATENT DOCUMENTS

| 5,287,288 | A | * | 2/1994 | Brennen et al. | 702/58 |
|---|---|---|---|---|---|
| 5,351,178 | A | * | 9/1994 | Brennen et al. | 363/40 |
| 5,351,180 | A | * | 9/1994 | Brennen et al. | 363/71 |
| 5,355,025 | A | * | 10/1994 | Moran et al. | 307/105 |
| 5,384,696 | A | * | 1/1995 | Moran et al. | 363/40 |
| 5,399,974 | A | | 3/1995 | Eriksson et al. | 324/521 |
| 5,446,387 | A | | 8/1995 | Eriksson et al. | 324/522 |
| 5,513,090 | A | * | 4/1996 | Bhattacharya et al. | 363/40 |
| 5,661,664 | A | | 8/1997 | Novosel et al. | 364/492 |
| 5,783,946 | A | | 7/1998 | Yang | 324/522 |
| 5,808,845 | A | | 9/1998 | Roberts | 361/79 |
| 5,809,045 | A | | 9/1998 | Adamiak et al. | 371/48 |
| 5,839,093 | A | | 11/1998 | Novosel et al. | 702/59 |
| 5,883,796 | A | | 3/1999 | Cheng et al. | 363/40 |
| 6,148,267 | A | | 4/2000 | Premerlani | 702/58 |
| 6,112,136 | A | | 8/2000 | Paul et al. | 700/293 |

* cited by examiner

*Primary Examiner*—Bao Q. Vu
(74) *Attorney, Agent, or Firm*—Seed IP Law Group PLLC

(57) ABSTRACT

A method and system for detecting the negative sequence of three phase grid-connected inverter systems utilizes, for example, computer hardware and/or computer software to remove a direct current component from a direct-axis current feedback for a three phase current of the inverter system to yield a pure alternating current waveform signal. A first low pass filter eliminates high frequency noise from the alternating current waveform signal while passing a negative sequence signal. The filtered signal is rectified to an absolute value, and a second low pass filter flattens the rectified signal to an output signal that is indicative of the magnitude of the negative sequence current.

27 Claims, 6 Drawing Sheets

METHOD AND SYSTEM FOR DETECTING A NEGATIVE SEQUENCE FOR THREE PHASE GRID-CONNECTED INVERTER SYSTEMS

BACKGROUND OF INVENTION

1. Field of the Invention

The present invention relates generally to the field of grid-connected inverter systems, and more particularly to a method and system for detecting the negative sequence for three phase grid-connected inverter systems.

2. Background of the Invention.

For grid-connected inverter systems, negative sequence detection is important for protection against grid fault, such as single-phase open and excessive unbalanced load, and to ensure smooth operation of the grid and prevent damage to the inverter or other equipment. In grid-connected inverter systems, if there is an imbalance of the load on one phase, it can cause damage to either the inverter or the other equipment. Therefore, it is important to detect such an imbalance, so that the inverter can disconnect and stop delivering power to the system. In order to detect a grid-connected inverter system imbalance, a technique that is typically employed is referred to as using the negative sequence to detect the imbalance. Either impedance unbalance or voltage unbalance causes unbalanced output phase current for grid-connected inverters. The negative sequence of three phase systems is often used as an indication of the system unbalance.

There are many ways to detect the negative sequence. One of the classical ways, as described in FIG. 1, requires a complicated calculation. The negative sequence of phase current can be expressed in terms of individual phase current (Ia, Ib, and Ic) and phase angle, theta, according to the negative sequence calculation shown in FIG. 1. The classical method illustrated in FIG. 1 also utilizes very special low pass filters to enable detection of the negative sequence. The low pass filters illustrated in FIG. 1 are necessary to increase the signal-noise ratio. However, these low pass filters limit the system performance because, for example, if the low pass filter is limited to 60 hz, then system performance cannot be detected past the cut-off frequency, and the system performance is limited by the low pass filter.

Referring to FIG. 1, the classical way of obtaining the negative sequence involves, for example, first multiplying the phase A current (Ia) times the cosine of the phase angle, theta; adding the difference between the phase C current (Ic) and phase B current (Ib) times the sine of the phase angle, theta, times one divided by the square root of three. This classical way also involves making the same calculation except with a negative sign. The result of each calculation is input through its own low pass filter, and the outputs are the real portion of the current (Ireal) and the imaginary portion of the current (Iimg). The real and imaginary portions of the current are then used for a root mean square calculation, in which negative current (Ineg) equals the square root of the sum of Ireal squared and Iimg squared. That is the classic calculation.

FIG. 2 illustrates an example of a waveform with a 25% imbalance, which means that the negative sequence is 25% of the positive sequence. The value of the Ireal is the magnitude of the alternating current (ac) of the wave, and the value of the Iimg is the direct current (dc) part represented by the solid horizontal line at 0.25 on the vertical axis. That is the dc offset, which is the portion of negative sequence. Assume, for example, that the three phases, Ia, Ib and Ic, are in perfect balance. In that case, after the calculation, the Ireal will be only a pure sine wave with no offset, which means that the center point of the sine wave will be at zero on the vertical axis. In FIG. 2, the vertical axis is the amplitude, which is 1.0, and the negative sequence is 0.25 or 25% of the positive sequence. In other words, the magnitude of the ac waveform is 1.0, and the curve is moved 0.25 upward on the plot. That is the offset that is caused by the negative sequence.

For example, if the input is 60 hz, Ia, Ib, and Ic, after the calculation shown in FIG. 1, Ireal will be 120 hz, and the Iimg part is dc, which is a constant. The severity of the dc offset is a measure of the severity of negative sequence, which is the classical way to measure the magnitude of the imbalance. It must be remembered that to measure the imbalance, it is necessary to relate the negative sequence to the positive sequence to determine the proportion. However, it is also necessary to detect the ac peak or the magnitude. In order to do that, the low pass filters are needed. The ac curve or waveform is the output of the first part of the calculation, and the low pass filter is used to smooth out the frequency so that the Ireal is filtered to a dc value. Thus, in the example, the Ireal is 1.0, and the Iimg is 0.25, which is a measure of the magnitude of the imbalance.

FIG. 2 shows that for a waveform for a 60 hz system before the low pass filters, the magnitude of negative sequence is 25% of the magnitude of positive sequence of the three phases Ia, Ib, and Ic of the alternating current. The frequency of the waveform is 120 hz, the amplitude of the waveform is the magnitude of positive sequence, and the direct current (dc)-offset of the waveform is the magnitude of negative sequence. The ratio of the amplitude versus the dc-offset of the waveform in FIG. 2 indicates the level of difficulty of designing the low pass filters. The higher the ratio, the more decay of the 120 hz component is needed to achieve good separation between signal (negative sequence, dc-offset) and noise (positive sequence, 120 hz). Also, the cut-off frequency of the low-pass filters, typically less than 60 hz for this case, cannot be too high. This causes a long time delay to detect the negative sequence in the classical method.

Because the output of the calculation block is 120 hz for a 60 hz system, the low pass filter typically requires a cut-off frequency that is lower than 60 hz, which causes a time delay in detecting the negative sequence. If the three current phases, Ia, Ib, and Ic, are changing rapidly, the changes will not show up on the Ireal, because of the low pass filter. The nature and purpose of the low pass filter is to smooth out the changes, so it tries to maintain the value to dc. If the inputs try to change, the purpose of the low pass filter is to smooth out those changes. Therefore, if Ia, Ib, and Ic change rapidly, they can become imbalanced, but the imbalance cannot be detected. Thus, the low pass filters used for the classical method prevent detection of imbalance in real time.

Moreover, the calculation for the negative sequence used for the classical method is a complicated, complex calculation process that requires greater computing power. The computation for the negative sequence according to the classical method, as shown in FIG. 1, involves, for example, eight multiplications, five additions/subtractions, one square-root, and two low-pass-filters. The calculation power required for the multiplications and square-root may force the microprocessor of the controller to a higher grade central processing unit (cpu), and, therefore, increases the cost.

SUMMARY OF INVENTION

It is a feature and advantage of the present invention to provide a method and system for real-time detection of the negative sequence of three phase grid-connected inverter systems, which enables the inverter to achieve grid-fault protection functions, such as single phase open, and disconnect itself from the grid.

It is another feature and advantage of the present invention to provide a method and system to simplify the detection of the negative sequence, which not only reduces the complexity of the calculation, but also improves the performance.

It is an additional feature and advantage of the present invention to provide a method and system for the detection of negative sequence that is simplified and therefore can be implemented either by software or by hardware or both.

To achieve the stated and other features, advantages and objects, an embodiment of the present invention utilizes, for example, computer hardware and/or software to provide a method and system for detecting the negative sequence for three phase grid-connected inverter systems. In an aspect of the present invention, a direct current component is removed from a direct-axis current feedback for a three phase current of the inverter to yield a pure alternating current waveform signal by subtracting the direct current component from the direct-axis current feedback. In this aspect, an input of the direct-axis component of a synchronous frame for at least two phases of the inverter system is received, and an amplitude of a frequency representing a magnitude of the negative sequence is extracted from the direct-axis component of the synchronous frame. The output of this aspect is the input for a first low pass filter.

The first low pass filter eliminates high frequency noise, such as natural high frequency noise from the inverter current input hardware sensing circuit, from the alternating current waveform signal while passing the negative sequence signal. The output of the first low pass filter is input to an absolute value function (ABS block), which rectifies the signal to an absolute value by removing a negative sign from a value of the signal. The rectifier doubles the frequency of the signal and outputs the rectified signal to a second low pass filter. The second low pass filter, which can have a cut-off frequency, for example, at least double the cut-off frequency of a first low pass filter, flattens the rectified signal. The output of the second low pass filter is a waveform signal indicative of a magnitude of the negative sequence current. This output signal can be compared, for example, to a preset threshold value that is determined by a percentage of negative sequence current to be detected. If the detected percentage of negative sequence current exceeds the preset threshold value, for example, a cut-off signal can be generated to the inverter system.

DETAILED DESCRIPTION

Referring now in detail to an embodiment of the present invention, an example of which is illustrated in the accompanying drawings, in which like numerals designate like components, an embodiment of the present invention provides a method and system to detect the negative sequence of three phase grid-connected inverter systems. The simplified detection method and system of the present invention not only reduces the complexity of the calculation, but also improves the performance. Because the calculation is simplified, the negative sequence detection can be implemented either by software or by hardware or both.

An embodiment of the present invention is based on the theory of synchronous frame transformation in which the frequency of the negative sequence component shown on the synchronous frame is twice the fundamental frequency, such as 120 hz for 60 hz power systems or 100 hz for 50 hz power systems. A key aspect of the method and system for an embodiment of the present invention is to extract the amplitude of the frequency, which represents the magnitude of negative sequence, from the direct-axis component of the synchronous frame.

Figure 3:
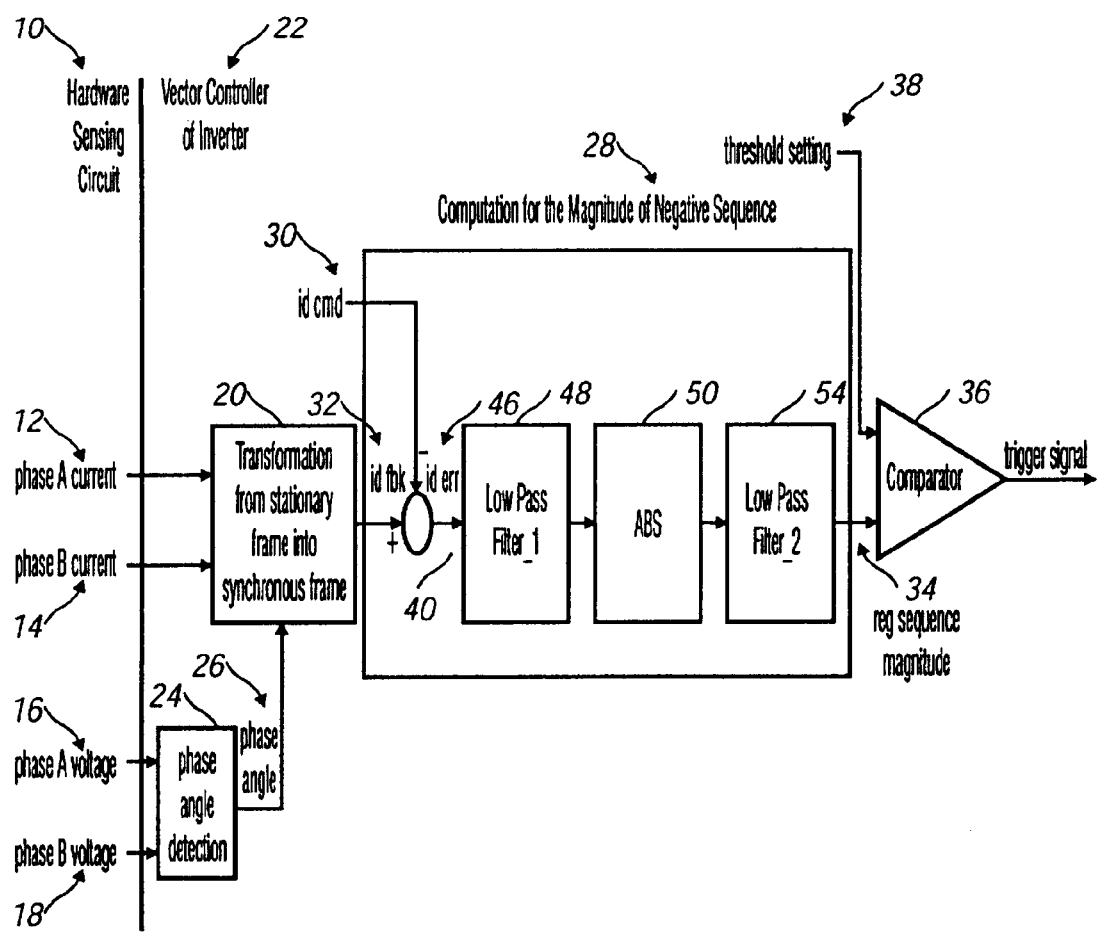
FIG. 3 shows an example of the algorithm for the method and system of negative sequence detection for an embodiment of the present invention.

FIG. 3 shows an example of the algorithm for the method and system of negative sequence detection for an embodiment of the present invention. Referring to FIG. 3, the calculation of the negative sequence requires only one subtraction, two low-pass filters, and one rectifier. The multiplications and square-root operation required in the traditional negative sequence computation are all avoided. The calculation of phase angle detection and transformation between stationary and synchronous frames is also required for typical vector controlled inverters. Therefore, this requirement does not cause extra microprocessor cpu time.

Referring again to FIG. 3, the input for the method and system for an embodiment of the present invention involves the use, for example, of a known hardware sensing circuit 10 for the Ia current 12 and Ib current 14 and the phase A voltage 16 and phase B voltage 18 of the inverter system current. The Ia current 12 and Ib current 14 are input to a known function for transformation from stationary frame into synchronous frame 20 of a vector controller 22 of the inverter system. The phase A voltage 16 and phase B voltage 18 are input to a known phase angle detection function 24 of the vector controller 22, and a phase angle 26 is output to the transformation from stationary frame into synchronous frame function 20.

Referring still further to FIG. 3, the inputs to a computation for the magnitude of negative sequence block 28 for an embodiment of the present invention are the direct-axis current command (id_cmd) 30 and direct-axis current feedback (id_fbk) 32. The output of the computation for the magnitude of negative sequence block 28 is the magnitude of the negative sequence current 34, and this signal can be used at a comparator 36 to compare a preset threshold value 38 to trigger a signal. The method for an embodiment of the present invention involves subtracting the id_cmd 30 from the id_fbk 32 at subtraction function 40. In the input to the computation block 28 are the Ia current 12 and Ib current 14 current and the transformation from stationary frame into synchronous frame 20. Because Ia, Ib, and Ic is an ac current, and it is, for example, at a 60 hz ac wave, after the transformation, it becomes id and iq which is referred to as the dq transformation; synchronous of the transformation. And in that transformation the id maintains a constant if Ia, Ib, and Ic are balanced.

Figure 4:
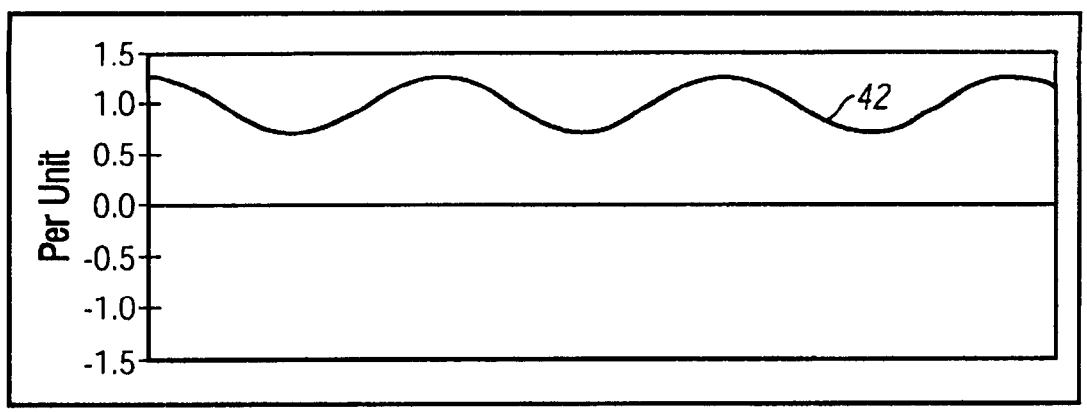
FIG. 4 shows an example of an id_fbk waveform for an embodiment of the present invention in which the magnitude of negative sequence is 25% of the magnitude of the positive sequence of Ia, Ib, and Ic.

FIG. 4 shows that for the id_fbk waveform 42, the magnitude of negative sequence is, for example, 25% of the magnitude of positive sequence of Ia, Ib, and Ic. Note that the amplitude and dc-offset of the id_fbk waveform 42 are different from the classical method of FIG. 1, since the transformation is different. In this case, if Ia, Ib, and Ic are not balanced, the id_fbk waveform 42 appears, for example, as shown in FIG. 4. In FIG. 4, the ac curve 42 is centered, for example, at 1.0 on the vertical axis with a magnitude of 0.25. The magnitude of the ac curve 42 indicates the negative sequence, and the center point, 1.0, indicates the positive sequence.

Figure 5:
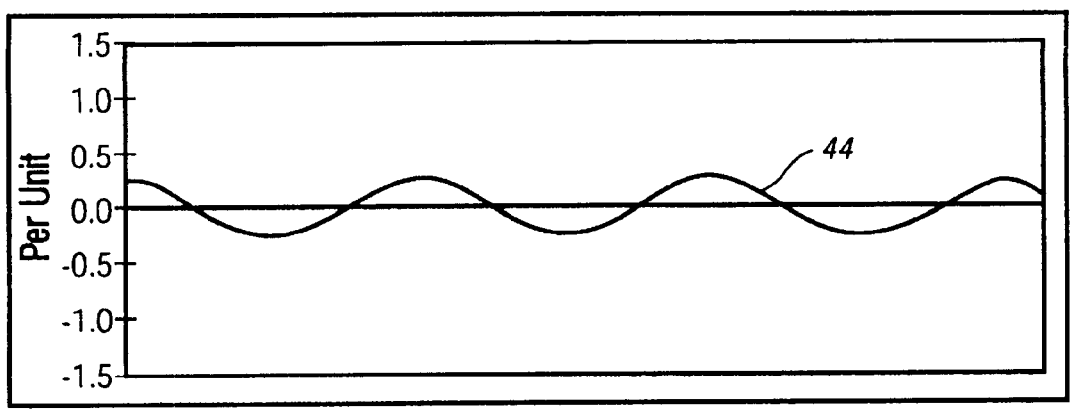
FIG. 5 shows an example of an id_err waveform for an embodiment of the present invention.

Referring again to FIG. 3, the first calculation of the method for an embodiment of the present invention is a subtraction 40 that removes the dc component (id_cmd) 30 from the direct-axis current feedback (id_fbk) 32. FIG. 5 shows the waveform 44 for id error (id_err) 46 resulting from subtracting the id_cmd 30 from the id_fbk 32. The id is a positive sequence, and by that subtraction, the id_err 46 becomes pure ac centered at zero, as shown in FIG. 5. Subtracting the id_cmd 30 from the id_fbk 32 gives the id_err waveform 44 shown in FIG. 5.

Figure 1:
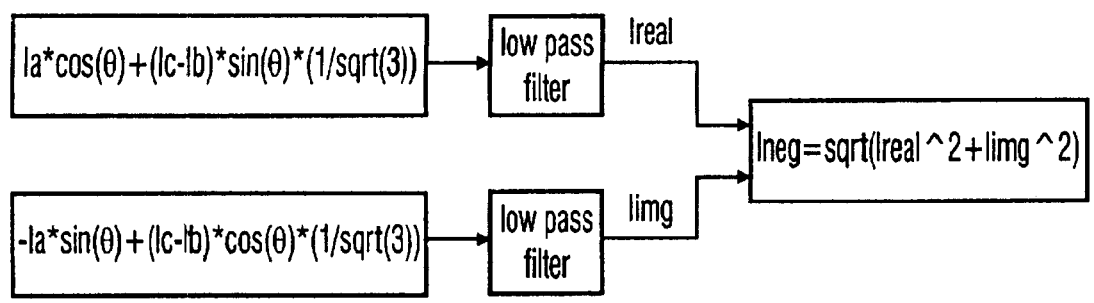
FIG. 1 shows an example of a classic negative sequence calculation.
Figure 2:
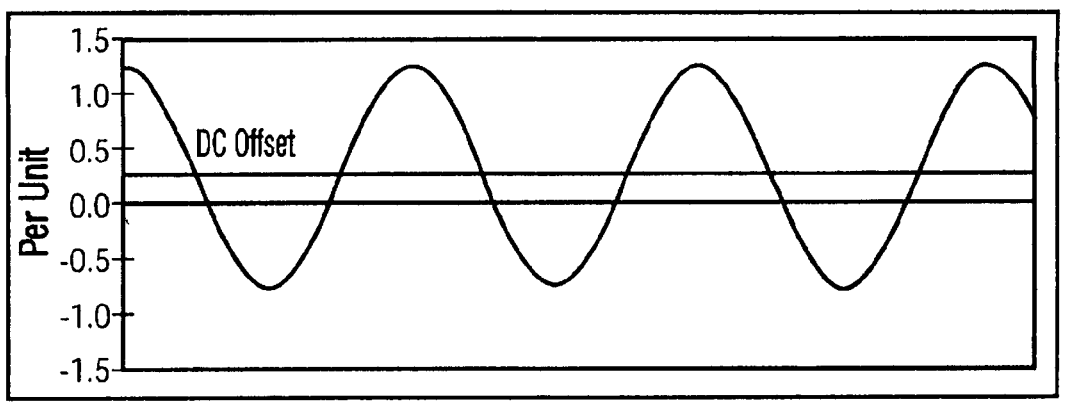
FIG. 2 shows an example of a waveform for a 60 hz system in which the magnitude of the negative sequence is 25% of the positive sequence.

Referring further to FIG. 3, the function of the low pass filter_1 48 is to eliminate high frequency noise from the hardware sensing circuit 10, but to bypass the desirable negative sequence signal, such as 120 Hz for a 60 Hz power system or 100 Hz for a 50 Hz power system. For example, a first-order low pass filter with a time constant of 0.75 milliseconds can be used for the low pass filter_1 48. The purpose of the low pass filter_1 48 is different from that of the low pass filters in FIG. 1. The function of the low pass filter_1 48 is to filter out high frequency noise, so that the cut-off can be set very high. In other words, the purpose of the low pass filter_1 48 is simply to filter out frequencies of a few khz, such as natural noise, which does not affect the good performance of the system. On the other hand, the purpose of the low pass filters shown in FIG. 1 is to smooth out the 120 hz signal.

Figure 6:
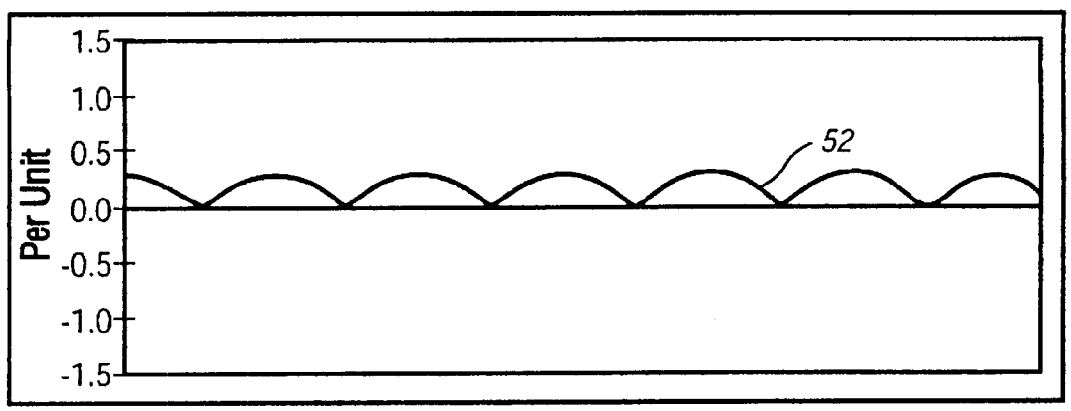
FIG. 6 shows an example of an output waveform of the ABS block for an embodiment of the present invention in which the frequency of the output signal is doubled when compared with the input signal.

Referring still further to FIG. 3, after the low pass filter_1 48 is the ABS block 50, which is a rectifier. For a positive value, the ABS 50 maintains the value, and the ABS block 50 puts an absolute value on a negative value. Thus, all values are positive, as shown, for example, in the output waveform 52 of the ABS block 50 illustrated in FIG. 6. The purpose of the rectifier of the ABS block 50 is to double the frequency of the input signal, so the frequency of the ac curve 52 is, for example, 120 hz,. The output 52 of the ABS block 50 is the absolute value of the input signal, or it is the rectified signal of id_err 46. FIG. 6 shows that the frequency of the output signal 52 is doubled when compared with the input signal. The higher frequency improves the detection performance and reduces the level of difficulty of designing the low pass filter_2 54.

Referring once again to FIG. 3, after doubling the frequency at the ABS block 50, the purpose of the low pass filter_2 54 is to deal with the doubled frequency, which is, for example, 120 hz. Thus, the low pass filter_2 54 can be 120 hz, which means that the system is twice as fast as the classical method. The function of the low pass filter_2 54 is to "flat" the output signal from the ABS block 50. For example, a first-order low pass filter with a time constant of 3.75 milliseconds can be used for the low pass filter_2 54.

Referring once more to FIG. 3, the output of the computation block 28 for an embodiment of the present invention is the magnitude of the negative sequence 34. The threshold setting 38 is determined by the percentage of negative sequence that is desired to be detected. For example, if it is desired to detect 50% percent of negative sequence, the threshold setting 38 is 50%. Likewise, if the desired level of detection is 25% of negative sequence, the threshold 38 is set at 25%. The output 34 of the computation block 28 is input to the comparator 36, and if the threshold 38 is set to detect, for example, 25% of the imbalance, a trigger signal is output to stop or disconnect the inverter.

An embodiment of the present invention simplifies the detection of negative sequence. The detection method of the present invention not only reduces the complexity of the calculation, thereby reducing cost, but also improves the performance. Further, the method for an embodiment of the present invention can be implemented either by software or by hardware.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for detecting a negative sequence current for a three phase grid-connected inverter system, comprising:
   removing a direct current component from a direct-axis current feedback for a three phase current of the inverter system to yield a pure alternating current waveform signal;
   eliminating high frequency noise from the alternating current waveform signal while passing a negative sequence signal;
   rectifying the signal to an absolute value; and
   flattening the rectified signal to an output signal that is indicative of a magnitude of the negative sequence current.

2. The method according to claim 1, wherein removing the direct current component further comprises subtracting the direct current component from the direct-axis current feedback.

3. The method according to claim 1, wherein removing the direct current component further comprises receiving an input of the direct-axis component of a synchronous frame.

4. The method according to claim 3, wherein removing the direct current component further comprises extracting an amplitude of a frequency representing a magnitude of the negative sequence from the direct-axis component of the synchronous frame.

5. The method according to claim 4, wherein removing the direct current component further comprises receiving an input of at least two phases of the inverter system current.

6. The method according to claim 1, wherein removing the direct current component further comprises inputting the alternating current waveform signal to a first low pass filter.

7. The method according to claim 1, wherein eliminating the high frequency noise further comprises eliminating high frequency natural noise from an inverter current input hardware sensing circuit.

8. The method according to claim 7, wherein eliminating the high frequency noise further comprises eliminating the high frequency noise by a first low pass filter.

9. The method according to claim 1, wherein eliminating the high frequency noise further comprises inputting the filtered signal to an absolute value function.

10. The method according to claim 1, wherein rectifying the filtered signal further comprises removing a negative sign from a value of the filtered signal.

11. The method according to claim 10, wherein rectifying the filtered signal further comprises doubling a frequency of the filtered signal.

12. The method according to claim 1, wherein rectifying the filtered signal further comprises inputting the rectified signal to a second low pass filter.

13. The method according to claim 1, wherein flattening the rectified signal further comprises filtering the rectified signal by a second low pass filter.

14. The method according to claim 13, wherein flattening the rectified signal further comprises filtering the rectified signal by a second low pass filter having a cut-off frequency at least double a cut-off frequency of a first low pass filter used for eliminating the high frequency noise from the alternating current waveform signal.

15. The method according to claim 1. further comprising comparing the output signal indicative of the magnitude of the negative sequence current to a preset threshold value.

16. The method according to claim 15, wherein comparing the output signal further comprises comparing the output signal to a preset threshold value that is determined by a percentage of negative sequence current to be detected.

17. The method according to claim 16, wherein comparing the output signal further comprises generating a cut-off signal to the inverter system if the detected percentage of negative sequence current exceeds the preset threshold value.

18. A system for detecting a negative sequence current for a three phase grid-connected inverter system, comprising:
    means for removing a direct current component from a direct-axis current feedback for a three phase current of the inverter system to yield a pure alternating current waveform signal;
    means for eliminating high frequency noise from the alternating current waveform signal while passing a negative sequence signal;
    means for rectifying the filtered signal to an absolute value; and
    means for flattening the rectified signal to an output signal indicative of a magnitude of the negative sequence current.

19. The system according to claim 18, wherein the means for removing the direct current component further comprises means for inputting the alternating current waveform signal to a first low pass filter.

20. The system according to claim 18, wherein the means for eliminating the high frequency noise further comprises a first low pass filter for eliminating high frequency natural noise from an inverter current input hardware sensing circuit.

21. The system according to claim 18, wherein the means for eliminating the high frequency noise further comprises means for inputting the filtered signal to an absolute value function.

22. The system according to claim 18, wherein the means for rectifying the filtered alternating current waveform signal further comprises means for removing a negative sign from the a value of the filtered alternating current waveform signal.

23. The system according to claim 18, wherein the means for rectifying the filtered alternating current waveform signal further comprises means for doubling a frequency of the filtered alternating current waveform signal.

24. The system according to claim 18, wherein the means for rectifying the filtered alternating current waveform signal further comprises means for outputting the rectified alternating current waveform signal to a second low pass filter.

25. The system according to claim 18, wherein the means for flattening the rectified alternating current waveform signal further comprises a second low pass filter for filtering the rectified alternating current waveform signal.

26. The system according to claim 18, further comprising means for comparing the output signal indicative of the magnitude of the negative sequence current to a preset threshold value.

27. The system according to claim 26, wherein the means for comparing the output signal further comprises means for generating a cut-off signal to the inverter system if the detected percentage of negative sequence current exceeds the preset threshold value.

* * * * *